US010440623B2

(12) United States Patent
Chandrashekar et al.

(10) Patent No.: US 10,440,623 B2
(45) Date of Patent: Oct. 8, 2019

(54) RADIO ACCESS NETWORK CONTROLLED ACCESS OF USER EQUIPMENT TO WIRELESS COMMUNICATION

(71) Applicant: Nokia Solutions and Networks Oy, Espoo (FI)

(72) Inventors: Subramanya Chandrashekar, Bangalore (IN); Hans Thomas Hoehne, Helsinki (FI); Dario Serafino Tonesi, Wroclaw (PL); Krzysztof Kordybach, Pulawy (PL); Mika Forssell, Tolkkinen (FI)

(73) Assignee: Nokia Solutions and Networks Oy, Espoo (FI)

( * ) Notice: Subject to any disclaimer, the term of this patent is extended or adjusted under 35 U.S.C. 154(b) by 213 days.

(21) Appl. No.: 15/501,468

(22) PCT Filed: Aug. 8, 2014

(86) PCT No.: PCT/EP2014/067050
§ 371 (c)(1),
(2) Date: Feb. 3, 2017

(87) PCT Pub. No.: WO2016/020010
PCT Pub. Date: Feb. 11, 2016

(65) Prior Publication Data
US 2017/0223596 A1    Aug. 3, 2017

(51) Int. Cl.
*H04W 36/22* (2009.01)
*H04W 28/08* (2009.01)
(Continued)

(52) U.S. Cl.
CPC ........... *H04W 36/22* (2013.01); *H04W 12/06* (2013.01); *H04W 28/08* (2013.01); *H04W 84/12* (2013.01)

(58) Field of Classification Search
CPC ..... H04L 5/0073; H04L 5/005; H04L 5/0035; H04L 5/0048; H04L 5/0091; H04W 72/082; H04W 72/06; H04W 52/241
(Continued)

(56) References Cited

U.S. PATENT DOCUMENTS 9,344,939 B2 *   5/2016   Sirotkin ................ H04W 36/16
9,538,418 B2 *   1/2017   Sirotkin ................ H04W 28/08
(Continued)

FOREIGN PATENT DOCUMENTS

WO    WO 2013/152483 A1    10/2013
WO    WO 2014/094849 A1    6/2014

OTHER PUBLICATIONS

3GPP TSG RAN#62, Busan, Korea, Dec. 3-6, 2013, RP-132086, New SID: Study on Multi-RAT Joint Coordination, CMCC, China Unicom, Huawei, 6 pgs.
(Continued)

*Primary Examiner* — Brian T O Connor
(74) *Attorney, Agent, or Firm* — Harrington & Smith

(57) ABSTRACT

The present invention provides apparatuses, methods, computer programs, computer program products and computer-readable media regarding radio access network (RAN) controlled access of user equipment (UE) to wireless communication networks. The method includes receiving, at a base station or controller of a cellular communication network, a request to offload traffic to a wireless communication network from an access point of the wireless communication network regarding user equipment served by the base station or controller, determining, at the base station or controller, whether to permit the user equipment to offload traffic to the wireless communication network, and trans-
(Continued)

mitting a message indicating whether it is permitted to offload traffic to the access point of the wireless communication network.

3 Claims, 4 Drawing Sheets

(51) Int. Cl.
*H04W 12/06* (2009.01)
*H04W 84/12* (2009.01)

(58) Field of Classification Search
USPC .......................................................... 370/329
See application file for complete search history.

(56) References Cited

U.S. PATENT DOCUMENTS

| 2011/0222523 | A1 | 9/2011 | Fu et al. ........................ 370/338 |
| 2012/0082090 | A1* | 4/2012 | Horn ..................... H04W 76/10 370/328 |
| 2015/0341845 | A1* | 11/2015 | Hedberg ............... H04W 12/08 370/329 |

OTHER PUBLICATIONS

3GPP TR 37.870 V0.2.0 (May 2014), "3$^{rd}$ Generation Partnership Project; Technical Specification Group Radio Access Network; Study on Multi-RAT Joint Coordination", 15 pgs.

\* cited by examiner

RADIO ACCESS NETWORK CONTROLLED ACCESS OF USER EQUIPMENT TO WIRELESS COMMUNICATION

FIELD OF THE INVENTION

The present invention relates to apparatuses, methods, systems, computer programs, computer program products and computer-readable media regarding radio access network (RAN) controlled access of user equipment (UE) to wireless communication networks.

BACKGROUND OF THE INVENTION

Due to the increase in data traffic in the operator's traffic, combined with the availability of Wi-Fi interface in most smartphones, operators look toward Wi-Fi as a supplementary capacity for offered services. This, however, may require higher coordination between 3GPP (3$^{rd}$ Generation Partnership Project) world and Wi-Fi and thus, in order to analyze the scope and means of a possible cooperation, a Study Item (SI) 'Multi-RAT Joint Coordination' was formed in RAN3 (cf. RP-132086 and TR 37.870). Among others, the SI addresses the question if any information exchange between 3GPP RAN (LTE in particular) and Wi-Fi is needed and, if so, what would be the most appropriate method to transfer this information. In pursuit of this, possible issues related to cooperation between Wi-Fi and LTE are being collected.

One of the problems related to the 3GPP RAN-Wi-Fi interaction is the absence or limited control of RAN over movement of UEs to a wireless communication network, like a wireless local area network (WLAN). Because the UE can automatically choose to select the available WLAN access point (AP), the 3GPP RAN does not get to know if the UE is attempting WLAN access and thus, is not aware of this. This prevents the RAN from controlling UE's traffic movement.

There are two reasons why the RAN might need better control over UE's movement. First, since the Quality of Service (QoS) management in WLAN network is not as granular and well defined as 3GPP RAN, the RAN might want to retain some selected services within itself to offer robust and reliable service to the UE. The QoS in WLANs can be different from the levels defined for the RAN such that switching the traffic path can have a negative effect on the required QoS. Second, because the RAN is the actual revenue generator for companies, the RAN would only want the WLAN to act as a supplementary radio access technology (RAT) and not share traffic indiscriminately, particularly when the RAN has free capacity. This would be an even bigger concern if the RAN providing company does not have a WLAN network of its own, because uncontrolled traffic in WLAN would negatively impact the RAN business case.

Currently, 3GPP RAN providers are using proprietary mechanisms to detect such UE movement. But there are proposals in Release 13 to solve this problem by making changes at the UE side to report any such activity.

SUMMARY OF THE INVENTION

It is therefore an object of the present invention to overcome the above mentioned problems and to provide apparatuses, methods, systems, computer programs, computer program products and computer-readable media regarding radio access network controlled access of user equipment to wireless networks.

According to an aspect of the present invention there is provided a method comprising:
receiving, at a base station or controller of a cellular communication network, a request to offload traffic to a wireless communication network from an access point of the wireless communication network regarding user equipment served by the base station or controller,
determining, at the base station or controller, whether to permit the user equipment to offload traffic to the wireless communication network, and
transmitting a message indicating whether it is permitted to offload traffic to the access point of the wireless communication network.

According to another aspect of the present invention there is provided an apparatus for use in a base station or controller of a cellular communication network, comprising:
at least one processor, and
at least one memory for storing instructions to be executed by the processor, wherein
the at least one memory and the instructions are configured to, with the at least one processor, cause the apparatus at least to perform:
receiving a request to offload traffic to a wireless communication network from an access point of the wireless communication network regarding user equipment served by the base station or controller,
determining whether to permit the user equipment to offload traffic to the wireless communication network, and
transmitting a message indicating whether it is permitted to offload traffic to the access point of the wireless communication network.

According to another aspect of the present invention there is provided an apparatus comprising:
means for receiving, at a base station or controller of a cellular communication network, a request to offload traffic to a wireless communication network from an access point of the wireless communication network regarding user equipment served by the base station or controller,
means for determining, at the base station or controller, whether to permit the user equipment to offload traffic to the wireless communication network, and
means for transmitting a message indicating whether it is permitted to offload traffic to the access point of the wireless communication network.

According to example versions of the present invention, the determination by the base station or controller whether to permit the user equipment to offload traffic to the wireless communication network is done based on at least one of information regarding load in a base station subsystem of the base station, load of the access point in the WLAN network, radio quality of the user equipment in the wireless communication network, an access point name of the service that the UE is attempting to access in WLAN, packet delay, and so on. However, it is noted that the above list of parameters which are considered in the determination is merely a list of some examples and is not exhaustive. Hence, any other parameters agreed by 3GPP and other useful AP parameters can be considered when making the determination.

According to another aspect of the present invention there is provided a method comprising:
recognizing, at an access point of a wireless communication network, an access of a user equipment, the user equipment being served by a base station or controller of a cellular communication network, transmitting a request to offload traffic to the wireless communication network for the user equipment to the base station or controller which serves the user equipment, receiving, at the access point, a response from the base station or controller indicating whether the request is permitted or not and checking the response, and if it is indicated in the response from the base station or controller that the offload is permitted, transmitting a message indicating the permission to the user equipment.

According to another aspect of the present invention there is provided an apparatus for use in an access point of a wireless communication network, comprising:

at least one processor, and at least one memory for storing instructions to be executed by the processor, wherein the at least one memory and the instructions are configured to, with the at least one processor, cause the apparatus at least to perform:

recognizing an access of a user equipment, the user equipment being served by a base station or controller of a cellular communication network, transmitting a request to offload traffic to the wireless communication network for the user equipment to the base station or controller which serves the user equipment, receiving a response from the base station or controller indicating whether the request is permitted or not and checking the response, and if it is indicated in the response from the base station or controller that the offload is permitted, transmitting a message indicating the permission to the user equipment.

According to another aspect of the present invention there is provided an apparatus comprising:

means for recognizing, at an access point of a wireless communication network, an access of a user equipment, the user equipment being served by a base station or controller of a cellular communication network, means for transmitting a request to offload traffic to the wireless communication network for the user equipment to the base station or controller which serves the user equipment, means for receiving, at the access point, a response from the base station or controller indicating whether the request is permitted or not and checking the response, and if it is indicated in the response from the base station or controller that the offload is permitted, means for transmitting a message indicating the permission to the user equipment.

According to example versions of the present invention, the method further comprises receiving, at the access point, an authentication request from the user equipment which accesses the access point, forwarding the authentication request to an authentication server, and receiving a response from the authentication server.

According to example versions of the present invention, the method further comprises checking the response, that is, determining, at the access point, whether the response from the authentication server indicates a successful authentication prior to transmitting the request to offload traffic and transmitting the request to offload traffic when it is determined that the response indicates a successful authentication.

According to example versions of the present invention, the method further comprises, if it is determined that the response indicates a successful authentication and that the offload is permitted, transmitting a successful authentication response message to the user equipment as the message indicating the permission.

According to example versions of the present invention, the method further comprises of withholding the authentication response at the access point, if it is determined that the response indicates a successful authentication, till the response of the offload request, from the base station or controller is obtained.

According to example versions of the present invention, the method further comprises tweaking the authentication response at the access point to indicate unsuccessful authentication to the user equipment, if it is determined that the response from the authentication server indicates a successful authentication and the response from the base station or controller indicates that the offload is not permitted.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
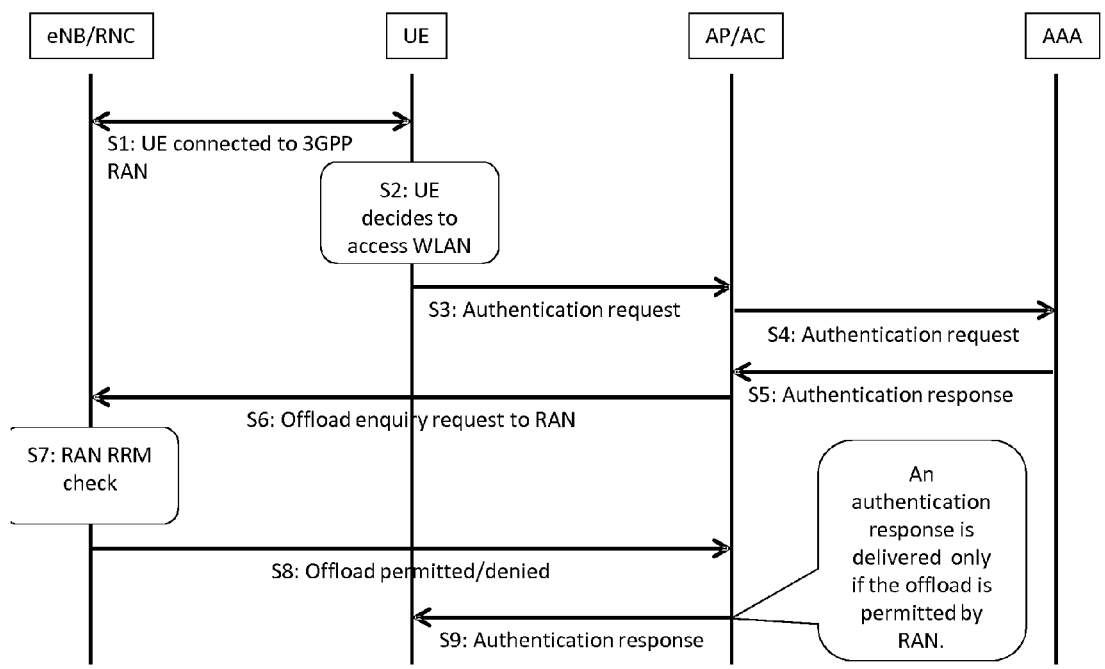
FIG. 1 is an exemplary signaling diagram illustrating an example of a procedure of an UE access to a WLAN network according to example versions of the present invention.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system, and a wireless communication network such as, for example, WLAN. However, it is to be noted that the present invention is not limited to an application using such types of communication systems or communication networks, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network controller elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to certain aspect of the present invention, it is proposed to introduce signaling that notifies the RAN about the request of an UE to connect to a WLAN.

Thus, it is proposed to use signaling over a direct interface between RAN node and the AP of a WLAN (proposed for 3GPP Release 13) to inform the RAN node (like and evolved Node B (eNB) or radio network controller (RNC)) about the UE's access and to seek permission from RAN as to whether the offload is permissible or not.

It is noted that the identification of the correct RAN node from the WLAN network (AP/AC) is out of the scope of this application and is to be handled as a separate issue.

FIG. 1 is an exemplary signaling diagram illustrating an example of a procedure of an UE access to a WLAN network according to example versions of the present invention.

Step S1 in FIG. 1 indicates that the UE is already connected to a 3GPP RAN network. Subsequently, in step S2, the UE either decides to automatically access the WLAN network or decides to offload traffic based on the RAN/ANDSF (Access Network Discovery and Selection Function) rules.

Then, in steps S3 and S4, the UE sends an authentication request to an authentication agent like an AAA (Authentication, Authorization and Accounting) server, which is routed through the AP/AC.

If the authentication is successful, the AAA server sends back an authentication response to the AP/AC in a step S5.

In step S6, the RAN is informed by the AP/AC of the UE access and that the UE seeks permission for offload (this requires a new message to be sent from the AP/AC to the eNB which is new AP/AC and eNB behavior). Among others, BSS (Base Station Subsystem) load, UE's radio quality in WLAN, APN (Access Point Name) of the bearer requested by UE are some of the important parameters which will help the RAN to determine whether the UE should be offloaded or not.

In step S7, the RAN Radio Resource Management (RRM) algorithm makes the necessary checks and communicates its decision to the AP/AC in step S8 (which requires new AP/AC and eNB behavior).

In case of a successful authentication, i.e. if the AP/AC has received a successful authentication response from the AAA, the AP/AP checks for the RAN decision (which requires a new message to be sent from the eNB to the AP/AC which is new AP/AC and eNB behavior).

In case the decision communicated in step S8 indicates that the eNB permits the offload to WLAN, the AP/AC transmits a successful authentication response to the UE in step S9.

Then, the UE knows that it is allowed to offload traffic to WLAN and starts offloading.

In case of a denial from RAN, the authentication response from AAA is tweaked (only if it is a success) to send a negative response to the UE (new AP/AC behavior). The offload message in step S8 and authentication message in step S9 can also contain differentiated permission, indicating a certain service flow of certain value or QoS parameters.

In the foregoing, a description of the whole communication system has been described with respect to a specific example.

In the following, a more general description of example versions of the present invention will be made with respect to specific entities of the communication system.

Figure 2:
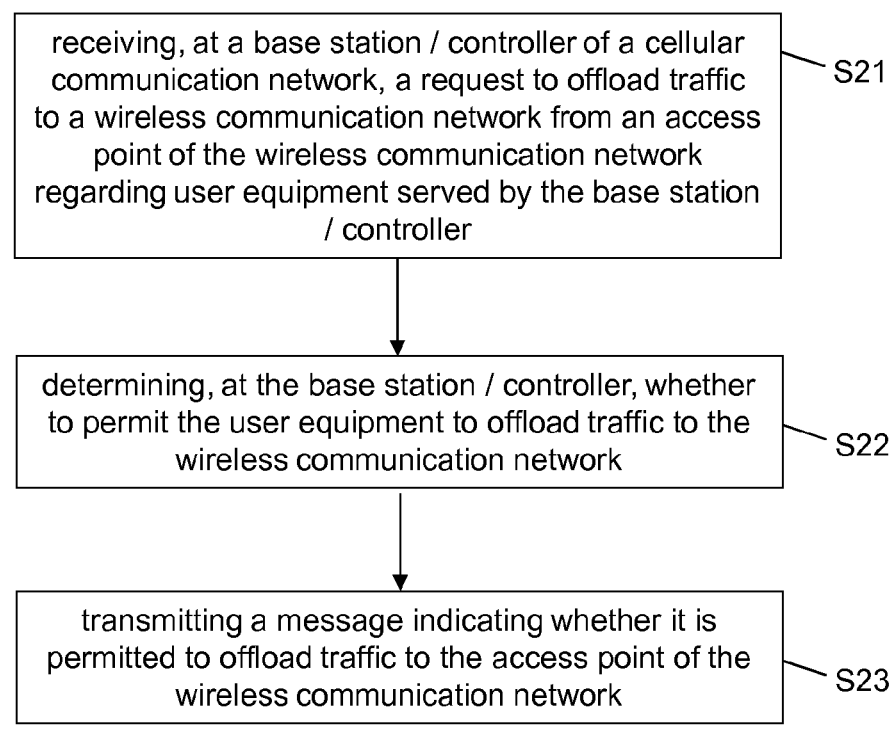
FIG. 2 is a flowchart illustrating an example of a method according to example versions of the present invention.

FIG. 2 is a flowchart illustrating an example of a method according to example versions of the present invention.

According to example versions of the present invention, the method may be implemented in a base station, like an eNB, or a radio network controller like a base station controller, or the like. The method comprises receiving, at a base station or controller of a cellular communication network, a request to offload traffic to a wireless communication network from an access point of the wireless communication network regarding user equipment served by the base station or controller in step S21. In step S22, the base station or controller determines whether to permit the user equipment to offload traffic to the wireless communication network. Then, in step S23, the base station or controller transmits a message indicating whether it is permitted to offload traffic to the access point of the wireless communication network.

According to example versions of the present invention, the determination by the base station or controller whether to permit the user equipment to offload traffic to the wireless communication network is done based on at least one of information regarding load in a base station subsystem of the base station, load of the access point in the WLAN network, radio quality of the user equipment in the wireless communication network, an access point name of the service that the UE is attempting to access in WLAN, packet delay, and so on. However, it is noted that the above list of parameters which are considered in the determination is merely a list of some examples and is not exhaustive. Hence, any other parameters agreed by 3GPP and other useful AP parameters can be considered when making the determination.

Figure 3:
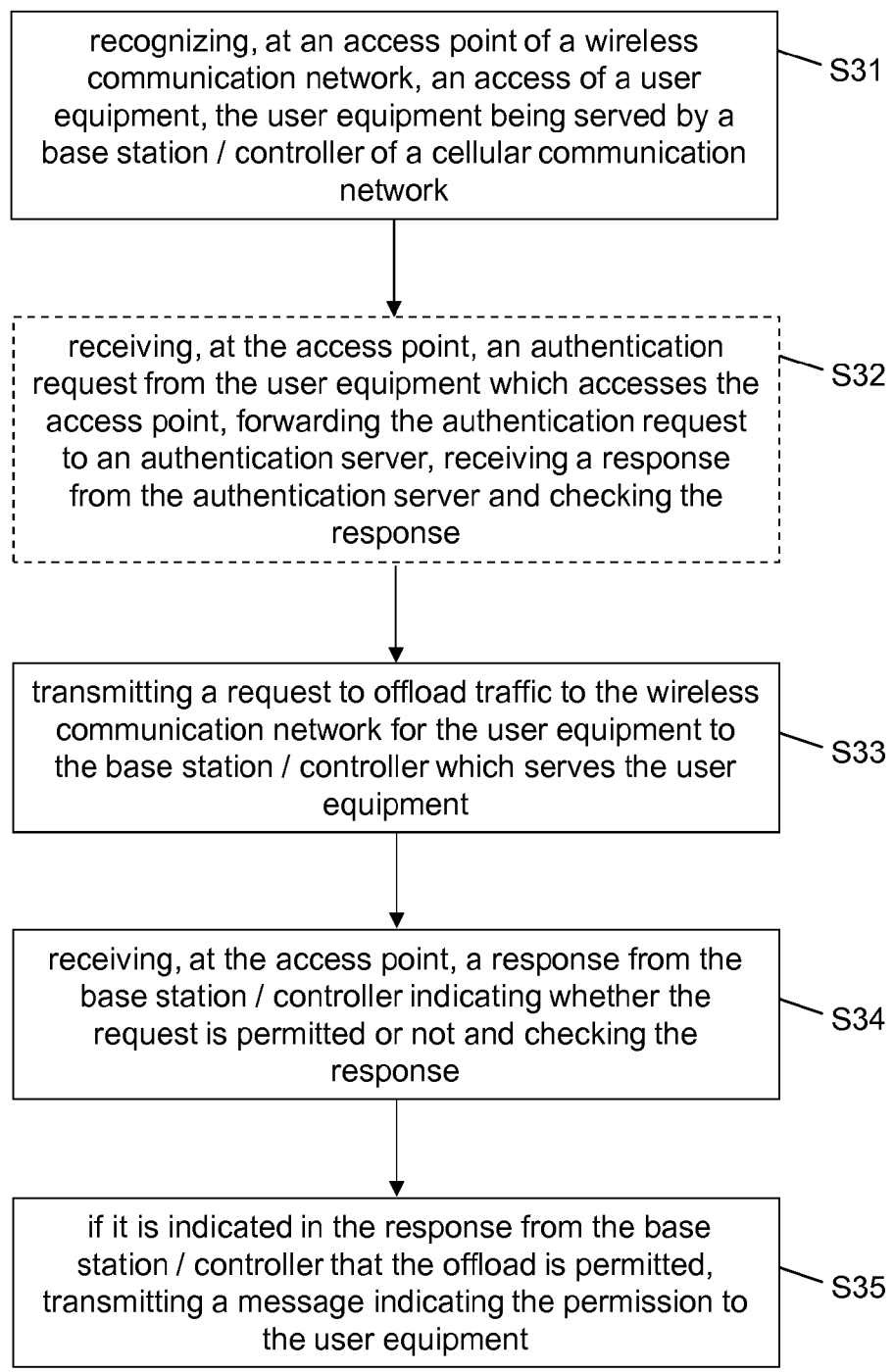
FIG. 3 is a flowchart illustrating another example of a method according to example versions of the present invention.

FIG. 3 is a flowchart illustrating another example of a method according to example versions of the present invention.

According to example versions of the present invention, the method may be implemented in an access point, like an AP of a WLAN or the like. The method comprises recognizing, at an access point of a wireless communication network, an access of a user equipment, the user equipment being served by a base station or controller of a cellular communication network in a step S31, and transmitting a request, seeking permission to offload traffic to the wireless communication network for the user equipment, to the base station or controller which serves the user equipment in a step S33. Then, in step S34, the access point receives a response from the base station or controller indicating whether the request is permitted or not and checks the response. If it is indicated in the response from the base station that the offload is permitted, the access point transmits a message indicating the permission to the user equipment in a step S35.

According to example versions of the present invention, the method further comprises receiving, at the access point, an authentication request from the user equipment which accesses the access point, forwarding the authentication request to an authentication server, and receiving a response from the authentication server in a step S32.

According to example versions of the present invention, the method further comprises checking the response in step S32, that is, determining, at the access point, whether the response from the authentication server indicates a successful authentication prior to transmitting the request to offload traffic and transmitting the request to offload traffic when it is determined that the response indicates a successful authentication.

Thus, according to example version of the present invention, the authentication procedure with the AAA is done prior to transmitting the request to the base station or controller and the request is only transmitted if the authentication is successful. However, it is noted that this is only an option and that the present invention is not limited thereto. For example, the request may alternatively also be transmitted during the authentication procedure. In such a case, the response from the base station or controller may only be checked if the authentication was successful.

According to example versions of the present invention, the method further comprises, if it is determined that the response indicates a successful authentication and that the offload is permitted, transmitting a successful authentication response message to the user equipment as the message indicating the permission.

According to example versions of the present invention, the method further comprises of withholding the authentication response at the access point, if it is determined that the response indicates a successful authentication, till the response of the offload request, from the base station or controller is obtained.

According to example versions of the present invention, the method further comprises tweaking the authentication response at the access point to indicate unsuccessful authentication to the user equipment, if it is determined that the response from the authentication server indicates a successful authentication and the response from the base station or controller indicates that the offload is not permitted.

Figure 4:
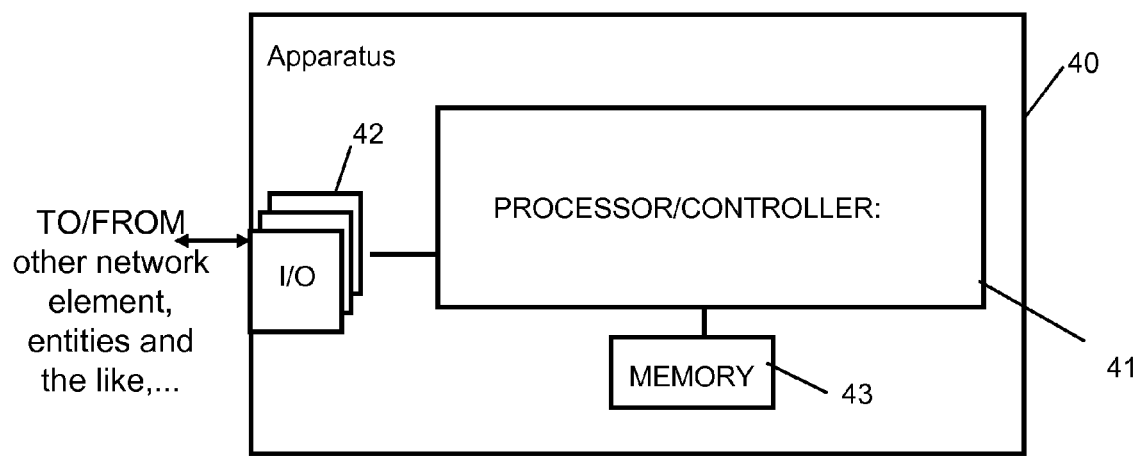
FIG. 4 is block diagram illustrating an example of an apparatus according to example versions of the present invention.

FIG. 4 is a block diagram showing an example of an apparatus according to example versions of the present invention.

In FIG. 4, a block circuit diagram illustrating a configuration of an apparatus 40 is shown, which is configured to implement the above described aspects of the invention. It is to be noted that the apparatus 40 shown in FIG. 4 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 40 may comprise a processing function or processor 41, such as a CPU or the like, which executes instructions given by programs or the like. The processor 41 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 42 denotes transceiver or input/output (I/O) units (interfaces) connected to the processor 41. The I/O units 42 may be used for communicating with one or more other network elements, entities, terminals or the like. The I/O units 42 may be a combined unit comprising communication equipment towards several network elements, or may comprise a distributed structure with a plurality of different interfaces for different network elements. Reference sign 43 denotes a memory usable, for example, for storing data and programs to be executed by the processor 41 and/or as a working storage of the processor 41.

The processor 41 is configured to execute processing related to the above described aspects. In particular, the apparatus 40 may be implemented in or may be part of a base station, like an eNB, or a base station controller, or the like, and may be configured to perform a method as described in connection with FIG. 2. Thus, the processor 41 is configured to perform receiving, at a base station or controller of a cellular communication network, a request to offload traffic to a wireless communication network from an access point of the wireless communication network regarding user equipment served by the base station or controller, determining, at the base station or controller, whether to permit the user equipment to offload traffic to the wireless communication network, and transmitting a message indicating whether it is permitted to offload traffic to the access point of the wireless communication network.

For further details regarding the functions of the apparatus 40 with respect to the base station or controller, reference is made to the description of the method according to example versions of the present invention as described in connection with FIG. 2.

According to other example versions of the present invention, the apparatus 40 may be implemented in or may be part of an access point, like an AP of a WLAN or the like, and may be configured to perform a method as described in connection with FIG. 3. Thus, the processor 41 is configured to perform recognizing, at an access point of a wireless communication network, an access of a user equipment, the user equipment being served by a base station or controller of a cellular communication network, transmitting a request to offload traffic to the wireless communication network for the user equipment to the base station or controller which serves the user equipment, receiving, at the access point, a response from the base station or controller indicating whether the request is permitted or not and checking the response, and if it is indicated in the response from the base station or controller that the offload is permitted, transmitting a message indicating the permission to the user equipment.

For further details regarding the functions of the apparatus 40 with respect to the access point, reference is made to the description of the method according to example versions of the present invention as described in connection with FIG. 2.

Thus, it is noted that the apparatus for use in a base station or controller and the apparatus for use in an access point, generally have the same structural components, wherein these components are configured to execute the respective functions of the base station or controller and the access point, respectively, as set out above.

In view of the above, it is an advantage of the present invention that there is no need for any changes at the UE side. Further, the proposed solution is backward compatible and it is faster than the currently proposed UE based solution.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-Programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
recognizing, at an access point of a wireless communication network, an access of a user equipment, the user equipment being served with a base station or controller of a cellular communication network,
receiving, at the access point, an authentication request from the user equipment,
forwarding the authentication request to an authentication server,
receiving, at the access point, a response from the authentication server and determining whether the response indicates a successful authentication, wherein when the response from the authentication server indicates a successful authentication:
withholding, at the access point, the authentication response,
transmitting a request to offload traffic to the wireless communication network for the user equipment to the base station or controller which serves the user equipment,
receiving, at the access point, a response from the base station or controller indicating whether the request is permitted or not and checking the response, and:
when it is indicated in the response from the base station or controller that the offload is permitted, transmitting a successful authentication response message to the user equipment indicating the permission to the user equipment; or
when it is indicated in the response from the base station or controller that the offload is not permitted, tweaking the authentication response at the access point to indicate unsuccessful authentication to the user equipment, and transmitting the authentication response to the user equipment.

2. An apparatus for use in an access point of a wireless communication network, comprising:
at least one processor, and
at least one non-transitory memory for storing instructions to be executed with the processor, wherein the at least one non-transitory memory and the instructions are configured to, with the at least one processor, cause the apparatus at least to perform:
recognizing an access of a user equipment, the user equipment being served with a base station or controller of a cellular communication network,
receiving an authentication request from the user equipment,
forwarding the authentication request to an authentication server,
receiving a response from the authentication server and determining whether the response indicates a successful authentication, wherein when the response from the authentication server indicates a successful authentication:
withholding the authentication response,
transmitting a request to offload traffic to the wireless communication network for the user equipment to the base station or controller which serves the user equipment,
receiving a response from the base station or controller indicating whether the request is permitted or not and checking the response, and:
when it is indicated in the response from the base station or controller that the offload is permitted, transmitting a successful authentication response message to the user equipment indicating the permission to the user equipment; or
when it is indicated in the response from the base station or controller that the offload is not permitted, tweaking the authentication response to indicate unsuccessful authentication to the user equipment, and transmitting the authentication response to the user equipment.

3. A computer program product comprising a non-transitory computer-readable medium including a program for a processing device, the program comprising software code portions that cause the processing device to perform a method comprising:
recognizing, at an access point of a wireless communication network, an access of a user equipment, the user equipment being served with a base station or controller of a cellular communication network, receiving, at the access point, an authentication request from the user equipment, forwarding the authentication request to an authentication server, receiving, at the access point, a response from the authentication server and determining whether the response indicates a successful authentication, wherein when the response from the authentication server indicates a successful authentication:

withholding, at the access point, the authentication response, transmitting a request to offload traffic to the wireless communication network for the user equipment to the base station or controller which serves the user equipment, receiving, at the access point, a response from the base station or controller indicating whether the request is permitted or not and checking the response, and:

when it is indicated in the response from the base station or controller that the offload is permitted, transmitting a successful authentication response message to the user equipment indicating the permission to the user equipment; or when it is indicated in the response from the base station or controller that the offload is not permitted, tweaking the authentication response at the access point to indicate unsuccessful authentication to the user equipment, and transmitting the authentication response to the user equipment.

\* \* \* \* \*